(12) United States Patent
Kettner et al.

(10) Patent No.: US 6,644,054 B1
(45) Date of Patent: Nov. 11, 2003

(54) METHOD AND DEVICE FOR OPERATING A REFRIGERANT SYSTEM

(75) Inventors: Detlef Kettner, Brühl (DE); Werner Schiller, Erzhausen (DE)

(73) Assignee: Siemens VDO Automotive AG, Frankfurt (DE)

(*) Notice: Subject to any disclaimer, the term of this patent is extended or adjusted under 35 U.S.C. 154(b) by 495 days.

(21) Appl. No.: 09/188,766

(22) Filed: Nov. 9, 1998

(30) Foreign Application Priority Data

Nov. 11, 1997 (DE) .......................... 197 49 635
Feb. 13, 1998 (DE) .......................... 198 05 880

(51) Int. Cl.$^7$ ................................. F25B 49/02
(52) U.S. Cl. ........................... 62/228.3; 62/228.4
(58) Field of Search .................. 62/228.3, 228.4, 62/228.5, 229, 234, 243, 244, 208, 209, 226, 215, 228.1

(56) References Cited

U.S. PATENT DOCUMENTS 4,856,293 A    8/1989    Takahashi
5,259,211 A  * 11/1993   Ikeda .................... 62/228.4
5,537,831 A  *  7/1996   Isaji et al. .......... 62/228.3 X

FOREIGN PATENT DOCUMENTS

| DE | 3731360 | 3/1988 |
| DE | 3935571 A1 | 5/1990 |
| DE | 3843924 | 6/1992 |
| DE | 4432272 | 5/1997 |
| EP | 94301307 B | 8/1994 |

* cited by examiner

Primary Examiner—Harry B. Tanner
(74) Attorney, Agent, or Firm—Mayer, Brown, Rowe & Maw LLP.

(57) ABSTRACT

A method and a device for operating a refrigerant system in an air conditioning unit for an automobile, in which air flowing through an evaporator is cooled via a refrigerant, the delivery rate of which is set by means of a compressor operated by a drive. The speed of the drive, operated independently of the automobile engine, is determined as a function of a suction pressure to be set on the compressor, thereby providing optimal energy consumption by the system.

9 Claims, 2 Drawing Sheets

METHOD AND DEVICE FOR OPERATING A REFRIGERANT SYSTEM

BACKGROUND OF THE INVENTION

The invention relates to a method for setting the suction pressure in a refrigerant circuit of an automobile, in which a current suction pressure is determined and is compared with a suction pressure to be set, the delivery rate of a refrigerant in the refrigerant circuit being set as a function of the comparison, and to a device for carrying out the method.

DE 38 43 924 C2 discloses a generic air conditioning system for an automobile. This air conditioning system has an engine and a compressor of variable capacity. The compressor is a swashplate compressor, in which the angle of inclination of the swashplate is modified and the displacement of the compressor is thus varied. With the aid of a detector device, the thermal load on the system is recorded and the necessary suction pressure of the compressor is determined as a function of the thermal load recorded. The desired suction pressure is corrected by varying the displacement of the compressor.

When the automobile engine is in the idling state, the idling speed of the engine is set according to the delivery rate of the compressor, in order to prevent the engine from stalling.

However, the disadvantage of using displacement-controlled compressors is that the influence of the back expansion volume on the control circuit is not taken into account.

In all controlled reciprocating piston compressions, the design-induced back expansion volume (switching space, dead volume) is of great importance, since, with increasing cutoff (that is to say, dead center shift), the ratio of back expansion volume to current displacement becomes more and more unfavorable. As a result of this, during cutoff, the volumetric efficiency, and therefore also the refrigerating capacity/compressor drive power ratio, becomes increasingly lower, thus leading to high energy consumption.

SUMMARY OF THE INVENTION

The object on which the invention is based is, therefore, to specify an air conditioning system, the energy consumption of which can be set optimally and which can nevertheless be produced by means of simple design.

The object is achieved, according to the invention, in that the suction pressure to be set is varied by regulating the speed of a drive element, the suction pressure to be set being determined as a function of the relative air humidity.

Advantageously the suction pressure can be modified continuously.

The advantage of the invention is that, due to the variable change in the desired value of the suction pressure, the same level of comfort is achieved by expending less energy.

In a further embodiment of the invention, a device for operating a refrigerant system in an air conditioning unit for an automobile has an evaporator, through which the air to be cooled flows, the air being cooled via a refrigerant, the delivery rate of which is set by means of a compressor operated by a drive. According to the invention, the speed of the drive, operated independently of the automobile engine, is determined as a function of a suction pressure to be set on the compressor.

The invention has the advantage that the compressor is operated in the part load range under conditions which are beneficial in energy terms, thereby achieving a saving of energy in the automobile. There is no need for the air temperature downstream of the evaporator to be reheated in order to achieve a comfortable interior temperature. At the same time, the ratio of refrigerating capacity to compressor drive power is set optimally. Control units arranged additionally on the compressor for setting the suction pressure are not necessary.

In a particular embodiment, a regulating device, which compares the current suction pressure with a suction pressure to be set, varies the speed of the drive during the entire operating period of the compressor as a function of the comparison.

Advantageously, the compressor and the speed-regulated drive, which, for example, is an electric motor, form a structural unit, which is accommodated in the automobile independently of the engine. It is thus possible for an air conditioning system to be retrofitted with such a speed-regulated compressor in a simple way.

Such structural units have low weight and small geometric dimensions. By means of this structural unit, a hermetically closed-off refrigerant system can be produced, this being advantageous, in particular, from the point of view of environmental protection.

In one embodiment, the regulating device activates the electric motor in a clocked manner. Activation which can be implemented in a simple way may be achieved, in particular, if the clocked activation of the electric motor is carried out by varying the pulse width of the activating signal generated by the regulating device.

In one development, the speed-regulated compressor has a fixed displacement. Compressors of complicated design, for example with a swash plate, may thus be dispensed with. The suction pressure is determined solely by the speed.

BRIEF DESCRIPTION OF THE DRAWINGS

The invention permits numerous embodiments. One of these will be explained in more detail with reference to the figures illustrated in the drawing, in which.

Identical features are denoted by the same reference symbols.

DETAILED DESCRIPTION OF THE PREFERRED EMBODIMENT

Figure 1:
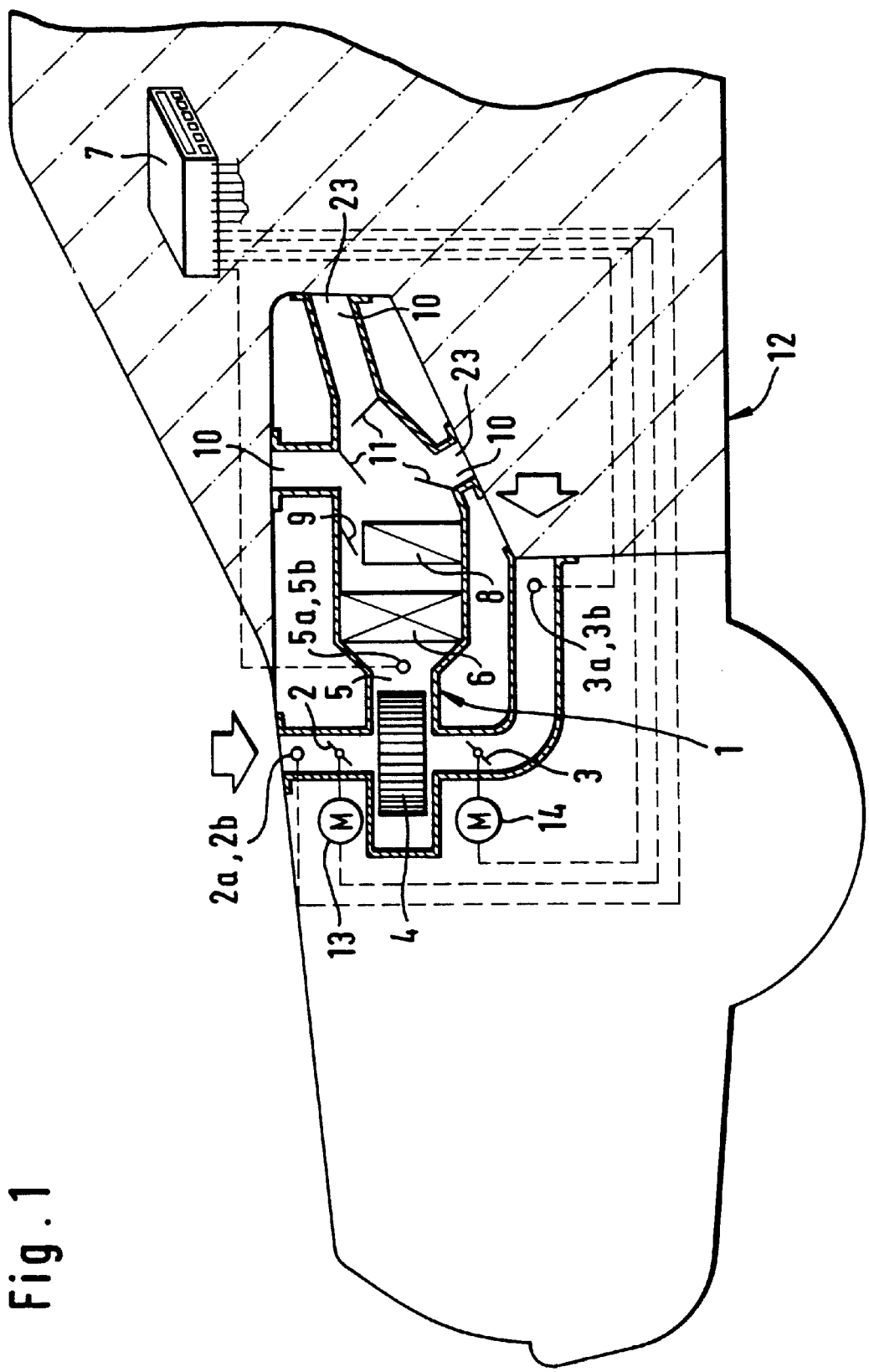
FIG. 1 shows an air-conditioning unit of an automobile.

FIG. 1 illustrates the air conditioning unit 1 in its actual arrangement in the automobile 12. Fresh air is sucked into the automobile 12 from the vehicle surroundings via the fresh air flap 2. The position of the fresh air flap 2 is controlled by a servomotor 13 as a function of electric signals which are generated by the air condition regulator 7.

The circulating air from the passenger compartment of the automobile 12 is likewise sucked in by the air conditioning unit 1 via the circulating air flap 3. The position of the circulating air flap 3 is also controlled by a servomotor 14 as a function of electric signals from the air condition regulator 7.

The circulating air and fresh air is delivered by means of a fan 4 and at the same time is swirled. Mixed air 5 is obtained, which is supplied to the evaporator 6 and, in the cooling mode, is discharged by the latter to the vehicle interior.

In the cooling mode, the mixed air 5 is discharged to the passenger compartment via outflow ports 10. These outflow ports 10 are arranged in ducts 23 which point respectively in the direction of the windshield, in the direction of the driver and front passenger and in the direction of the driver's and front passenger's foot region. By means of the air distributor flaps 11 arranged in the individual ducts, the inlet of air can be regulated by the driver or front passenger.

The evaporator 6 is followed by a heating heat exchanger 8. The heating heat exchanger 8 is illustrated merely for the sake of completeness and need not be considered in any more detail below.

In order to detect the thermal load on the system, a temperature sensor 2a and a sensor for the relative air humidity 2b are arranged in the fresh air stream in the vicinity of the fresh air flap 2.

A temperature sensor 3a and a further sensor for the relative air humidity 3b are arranged in the vicinity of the circulating air flap 3. The signals from the temperature sensors 2a, 3a and from the air humidity sensors 2b, 3b are supplied to the air condition regulator 7 for calculating the specific enthalpies for the fresh air and the circulating air, the air condition regulator 7 opening and closing the fresh air flap 2 and the circulating air flap 3 as a function of these signals in such a way that the lowest enthalpy difference is set at the evaporator 6.

Figure 2:
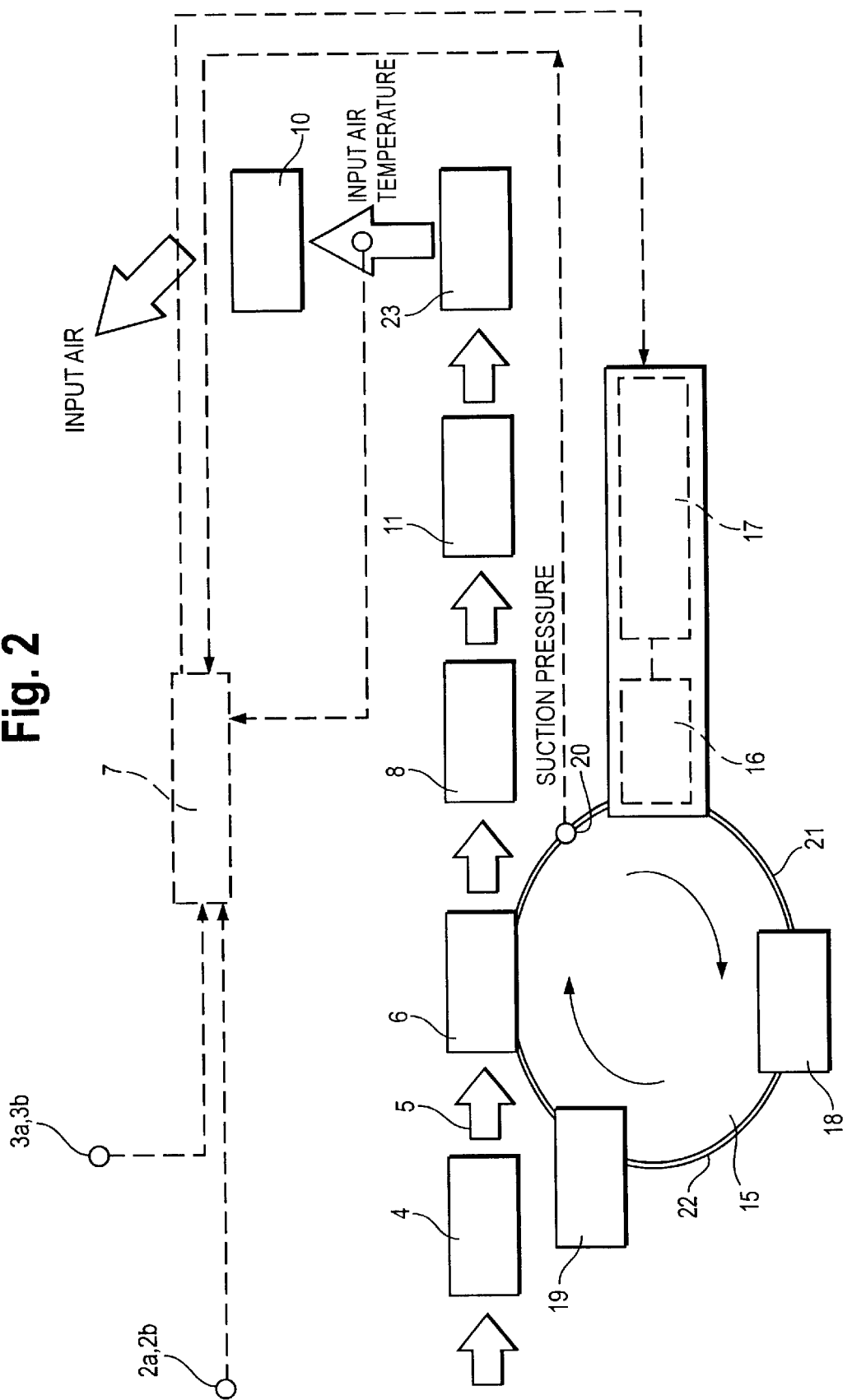
FIG. 2 shows a refrigerant circuit according to the invention belonging to the automobile.

The refrigerant circuit according to the invention will now be explained with reference to FIG. 2.

As already explained, the mixed air 5 appearing downstream of the fan 4 is supplied to the evaporator 6. In the cooling mode, this evaporator 6 is cooled with the aid of a refrigerant circuit 15, so that the air emerging into the passenger-compartment interior acquires the temperature which the driver desires.

The evaporator 6 is cooled via a refrigerant which is circulated in the refrigerant circuit 15 in suction and delivery lines 21, 22.

The refrigerant evaporates in the evaporator 6 and is subsequently sucked in, and compressed, by the compressor 16. The compressor 16 forms a structural unit with a speed-regulated electric motor 17. Advantageously, the compressor 16 and electric motor 17 are arranged together in a metal housing, so that large temperature differences can be absorbed.

The refrigerant is thereafter cooled and condensed in a condenser 18, and the liquid refrigerant is subsequently expanded by means of an expansion unit 19 and supplied to the evaporator 6 again as wet steam.

In order, then, that the delivery rate of the refrigerant can be controlled in proportion to a thermal load on the system, the thermal load on the system must be determined in the air condition regulator 7. The thermal load varies as a function of the temperature and humidity within the passenger compartment, the sun's rays, etc.

As already described, the thermal load is communicated to the air condition regulator 7 by the fresh air sensors 2a, 2b and the circulating air sensors 3a, 3b.

The air condition regulator 7 evaluates the signals supplied by the sensors 2a, 2b, 3a, 3b, compares them with the desired temperature set by the automobile driver and determines the desired value for the suction pressure from these parameters. This desired value is compared with a current suction pressure, which is measured by the pressure sensor 20 in the intake line of the compressor 16 and is transmitted to the air condition regulator 7. The electric motor 17 is activated by means of a pulse-width-modulated voltage signal corresponding to the result of the comparison between the current suction pressure and the desired value of the suction pressure. It is possible, by virtue of this regulation, to set the speed on the compressor 16, which has a fixed displacement, according to the refrigerating capacity demand and the limit value for the suction pressure. The functional relation between the minimum suction pressure and the speed of the drive is stored in the air condition regulator 7.

By virtue of the present invention, the suction pressure is determined by the level of comfort to be set in the automobile interior. In this case, the level of comfort to be set is predetermined by the temperature and the relative air humidity. Since a specific evaporation temperature of the refrigerant in the evaporator 6 is always associated with a specific suction pressure, this specific suction pressure corresponds to a specific surface temperature on the evaporator 6, provided that the air mass flow and the air temperature and relative humidity are the same. Since the suction pressure corresponds to a specific surface temperature, the speed of a drive motor 17 is regulated in such a way that a suction pressure which corresponds to a desired surface temperature on the evaporator 6 is set, with the result that the desired state is set in the vehicle.

It must be borne in mind, at the same time, that, with the suction pressure being the same, different delivery rates of the refrigerant can be set as a function of the prevailing climatic conditions, this being, in particular, a consequence of the density of the refrigerant being a function of the temperature.

The level of comfort in the automobile interior is influenced even more specifically if the state on the condensers 18 is taken into account in addition to the climatic conditions. In the condenser 18, the heat which the refrigerant absorbs in the evaporator 6 is discharged, as is the heat which occurs during the compression operation. If this heat is not discharged correctly, the suction pressure also rises if the delivery rate stays the same. There is, in particular, a direct relationship between suction pressure and the absolute humidity, with the result that the humidity in the vehicle can also be set specifically via the suction pressure.

We claim:

1. A method for setting the suction pressure in a refrigerant circuit of an automobile, in which a current suction pressure is determined and is compared with a suction pressure to be set, the delivery rate of a refrigerant in the refrigerant circuit being set as a function of the comparison, wherein the suction pressure to be set is varied by regulating the speed of a drive element.

2. The method as claimed in claim 1, wherein the suction pressure to be set can be modified continuously.

3. A device for operating a refrigerant system in an air conditioning unit for an automobile, in which air flowing through an evaporator is cooled via a refrigerant, the delivery rate of which is set by means of a compressor operated by a drive, wherein the speed of the drive, operated independently of the automobile engine, is determined as a function of a suction pressure to be set on the compressor.

4. The device as claimed in claim 3, wherein the compressor and the drive form a structural unit.

5. The device as claimed in claim 3, wherein a regulating device compares the current suction pressure with the suction pressure to be set and varies the speed of the drive during the entire operating period of the compressor as a function of the comparison.

6. The device as claimed in claim 5, wherein the drive is an electric motor.

7. The device as claimed in claim 6, wherein the regulating device activates the electric motor in a clocked manner.

8. The device as claimed in claim 7, wherein the clocked activation of the electric motor is carried out by varying the pulse width of the activating signal generated by the regulating device.

9. The device as claimed in claim 5, wherein the compressor has a constant displacement.

* * * * *